United States Patent
Darnell

(10) Patent No.: US 7,416,261 B2
(45) Date of Patent: Aug. 26, 2008

(54) QUICK CHANGE ADJUSTABLE TRACK CENTER FRONT HUB ASSEMBLY AND METHOD OF USE

(75) Inventor: Thomas A. Darnell, Lawrence, KS (US)

(73) Assignee: Hiper Technology Inc., Lawrence, KS (US)

( * ) Notice: Subject to any disclaimer, the term of this patent is extended or adjusted under 35 U.S.C. 154(b) by 236 days.

(21) Appl. No.: 11/095,218

(22) Filed: Mar. 31, 2005

(65) Prior Publication Data

US 2006/0220444 A1 Oct. 5, 2006

(51) Int. Cl.
*B60B 23/00* (2006.01)
*B60B 25/00* (2006.01)

(52) U.S. Cl. .................. 301/111.03; 301/16; 301/120

(58) Field of Classification Search ........... 301/9.1–9.2, 301/10.1, 16, 35.52, 35.61, 35.621, 120, 301/35.63, 35.623, 35.625, 105.1, 111.01–111.04
See application file for complete search history.

(56) References Cited

U.S. PATENT DOCUMENTS

| | | | | | |
|---|---|---|---|---|---|
| 2,001,242 | A | * | 5/1935 | Dodge | ..................... 301/35.61 |
| 2,676,849 | A | * | 4/1954 | Houck et al. | .................... 301/1 |
| 4,290,654 | A | * | 9/1981 | Majkrzak et al. | ............. 301/9.2 |
| 5,328,252 | A | * | 7/1994 | Thompson | ............. 301/64.305 |
| 5,947,613 | A | * | 9/1999 | Cormier | ..................... 301/122 |
| 6,533,363 | B1 | * | 3/2003 | Hayes et al. | ............. 301/105.1 |
| 6,609,765 | B2 | * | 8/2003 | Radke et al. | ................. 301/128 |
| 6,793,293 | B2 | * | 9/2004 | Bunnow et al. | ............ 301/11.1 |
| 2003/0080609 | A1 | * | 5/2003 | Darnell | .................... 301/95.11 |

* cited by examiner

*Primary Examiner*—Jason R Bellinger
(74) *Attorney, Agent, or Firm*—V. Craig Belair; Patton Boggs LLP

(57) ABSTRACT

The quick-change adjustable track center front hub assembly is secured to a spindle axle of a sprint car by a friction drive bearing system located between the spindle axle and the front hub assembly. The bearings are spaced apart to provide increased side and torsional load carrying capability. In addition, the hub includes a section of external splines for accepting at least one spacer and a wheel center section both having internal splines for mating with the external splines on the hub. A single lug nut connects to the outboard end of the hub for securing the spacers and wheel center sections to the front hub assembly to provide a quick-change arrangement not found before in sprint-type cars. A brake rotor is attached to the hub inboard of the spacers and wheel center section, thus allowing unimpaired accessibility to the wheel center section and spacers for quick-changing and adjusting the track center of the front wheels of the sprint-type cars.

20 Claims, 13 Drawing Sheets

QUICK CHANGE ADJUSTABLE TRACK CENTER FRONT HUB ASSEMBLY AND METHOD OF USE

FIELD OF THE INVENTION

This invention relates broadly to the field of motor sports, and more particularly relates to a quick-change adjustable track center front hub assembly for sprint cars.

Problem

It is a problem in the field of sprint cars to have a quick-change front hub assembly that provides adjustable track center capabilities for the front wheels of the cars. For about the past 15-20 years manufacturers of sprint cars have had a quick-change rear hub assembly that adjusts the track center, both outwardly and inwardly, of the rear wheels relative to the centerline of the car. This has been achieved by using splined axles and tapered or flat spacers that are secured onto the axle. Then the rear rim, which also has a splined center section for mating with the splined axle, is secured onto the axle with a single large lug nut. The tapered and flat spacers are used to adjust the track center of the rear hub assembly inwardly or outwardly relative to the centerline of the car. Additionally, rims and rim offsets are utilized to further adjust the track center of the rear wheel assemblies. However, nothing to date has addressed the lack of adjustable track center for the front wheels of a sprint car.

Further, an additional problem with present day front hub assemblies found in sprint cars is the fact that the rear wheels are secured with a single large lug nut, yet the front wheels are secured with four to five smaller lug bolts, thus requiring different tools to remove each. This further handicaps any quick front wheel replacement for present day racers.

Additionally, with the ongoing development of technology in sprint car racing, the cars race at faster speeds, thus causing increased side loads, vertical loads, and torsional loads on the bearings and related parts of the front hub assemblies. Yet, the arrangement, number, and spacing of these bearings within the hub assembly has not changed to counter these increased load forces, thus wheel assembly failures are likely to occur and safety of racers will be jeopardized with the continued bearing and hub arrangements found in today's sprint cars.

Also, with the recent development of front left side braking, followed by front right side braking, brake discs or rotors are now found attached to the center section of each rim half of each wheel. In addition, calipers that are located over these rotors further add to the mechanical clutter of these front hub assemblies. Thus, additional time must be spent removing the calipers from the rotors prior to removing and changing the front wheels. These recent developments further impair any design or development towards a quick-change front hub assembly for these sprint cars.

Therefore, there is a need for a quick-change front hub assembly that provides an adjustable track center for the front wheels of sprint cars, while providing front end braking capabilities, and that are affordable to manufacture.

Solution

The above-described problems are solved and a technical advance is achieved in the art by the present quick-change adjustable track center front hub assembly. The quick-change adjustable track center front hub assembly includes a hub that has a splined section for accepting splined spacers and a splined wheel center section that can be positioned respective to each other in differing arrangements to provide varying distances of track center for each individual front wheel. This allows a user of the quick-change adjustable track center front hub assembly to quickly adjust the track center of each front wheel, a feature that has not been available until now.

In addition, the quick-change adjustable track center front hub assembly includes a single lug nut that has the same dimensions of the rear lug nut, thus solving the problem of needing different tools to change the front and rear wheels of the sprint cars. The quick-change adjustable track center front hub assembly, further includes a frictional drive bearing system that includes a cap screw and torque nut, such that when tightened, they further provide the force for tightening the races of the bearings, which then cause the races to grip around the spindle axle and the hub in a frictional drive bearing system.

The quick-change adjustable track center front hub assembly can also be used with existing sprint car front spindles without having to change axles or spindles to accommodate the assembly. The quick-change adjustable track center front hub assembly further may include optional front brake disc rotors that are inboard from the adjustable portion of the quick-change adjustable track center front hub assembly so that the wheel and the track center of each wheel can be changed without having to remove the calipers from the brake rotor.

In addition, the quick-change adjustable track center front hub assembly includes a bearing configuration that supports the side and torsional loads found in today's sprint cars. The configuration includes separating with distance the farther most inboard and outboard bearings and including additional bearings where warranted to provide additional support for these increase loads.

Further, the track center adjustment is provided by using removable spacers that offset the track center or width of the front wheels of the sprint car from the centerline of the car. These spacers can be arranged relative to each other and the wheel center section in a desired fashion to provide track center adjustment in a quick-change environment.

SUMMARY

The invention provides a front hub assembly for use on a spindle axle of a sprint car for providing quick-change and adjustable track center of a front wheel, including: a hub having an inboard end and an outboard end and an external surface and an internal surface, the external surface having external splines that run substantially parallel to the major axis of the hub, the external splines located between the inboard end and the outboard end of the hub; at least two bearings spaced apart from each other by a distance, each of the at least two bearings having an inner race and an outer race, the inner race securingly contacting the spindle axle and the outer race securingly contacting said internal surface of the hub; at least one spacer located between the inboard end and the outboard end of the hub having internal splines for mating with the external splines of the external surface of the hub; a cap screw for connecting to the outboard end of the spindle axle for securing said at least two bearings to the spindle axle; and a lug nut for connecting to the outboard end of the hub for securing the at least one spacers to the front hub assembly. Preferably, the hub is substantially cylindrically shaped. Preferably, the internal surface of the hub has an inner diameter greater than the outer diameter of the spindle axle. Preferably, the inboard end further comprises a flanged structure for attaching a brake rotor to the hub.

Preferably, the hub comprises a material selected from the group consisting of aluminum, aluminum alloys, wrought aluminum, magnesium, titanium, nickel, zinc, and alloys of materials. Preferably, each of the at least two bearings is between 1/8 inch to about 1 inch in width. Preferably, each of said at least two bearings is 1/2 inch in width. Preferably, the front hub assembly further includes a snap ring located around the spindle axle inboard of the at least two bearings. Preferably, the front hub assembly further includes an axel spacer located between the at least two bearings for providing the distance between the at least two bearings on the spindle axle. Preferably, the at least two bearings further comprises two bearings adjacent to each other outboard from a single bearing separated by the axle spacer. Preferably, the front hub assembly further includes a wheel center section located between the inboard end and the outboard end of the hub, the wheel center section having internal splines for mating with the external splines of the external surface of the hub.

These and other features, aspects, and advantages of the present invention will become better understood with regard to the following description, appended claims, and accompanying drawings.

DETAILED DESCRIPTION OF THE DRAWINGS

In accordance with the present quick-change adjustable track center front hub assembly ("front hub assembly"), the front hub assembly may be used with all sprint cars, including micro or mini sprint cars. The track center means the distance between the center line of a wheel and the centerline of the car. The centerline of a car means the major axis of a car that runs from the front to the rear of the car. The term inboard is a term that means a component or element is nearer to or towards the centerline of the car and the term outboard is a term that means a component or element is farther from or away from the centerline of the car. The wheel center section and brake rotor as described below are optional elements of the front hub assembly and are described to show the environment of these components. They are not required elements of the front hub assembly.

Figure 1:
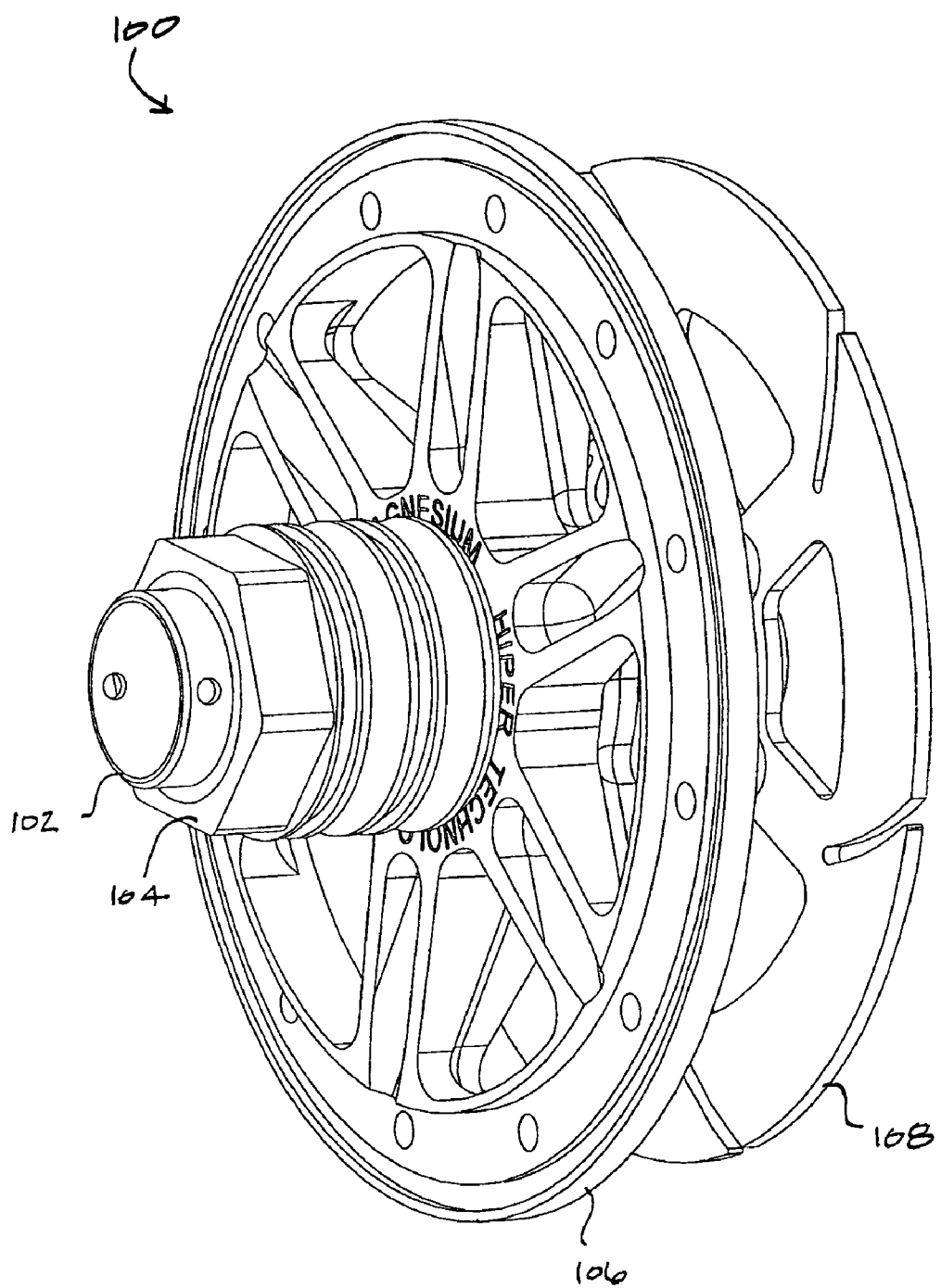
FIG. 1 illustrates an isometric view of an embodiment of a quick-change adjustable track center front hub assembly of the present invention.

FIG. 1 illustrates an embodiment of the front hub assembly 100 and includes a hub 102 that has preferably a threaded end for accepting lug nut 104 that secures an optional wheel center section 106 to the hub 102. The front hub assembly 100 optionally includes a brake rotor 108 for use with calipers of a braking system (not shown).

Figure 2:
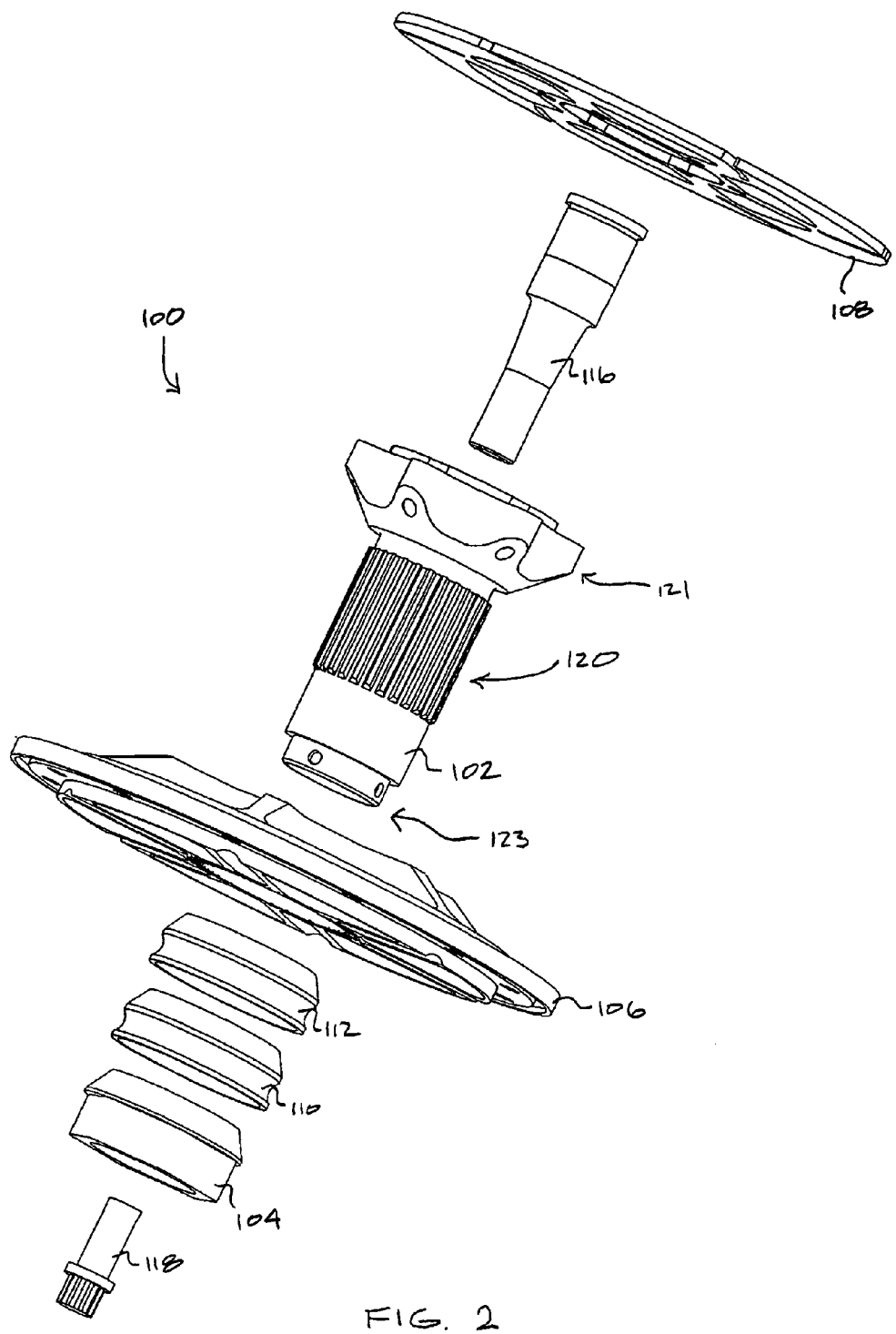
FIG. 2 illustrates an exploded isometric view of the quick-change adjustable track center front hub assembly of FIG. 1 of the present invention where spacers are located outboard of the wheel center section of the present invention.

FIG. 2 illustrates an exploded view of the front hub assembly 100 depicting the hub 102 which has an inboard end 121 which points towards the centerline of the car and an outboard end 123 which points away from the centerline of the car. Hub 102 further has an external splined portion 120 that runs substantially parallel along the major axis of the hub 102 between the inboard end 121 and the outboard end 123. The wheel center section 106 includes internal splines 126 (shown in FIG. 6) that mate with the external splined portion 120 of the hub 102 when the wheel center section 106 is slid over the outboard end 123 of the hub 102 as shown in FIG. 1. The front hub assembly 100 further includes at least one spacer 110 for spacing or adjusting the track center of the wheel center section 106 inboard or outboard from the centerline of the car. FIG. 2 illustrates two spacers 110, 112 for adjusting the track center of the wheel center section 106. The spacers preferably include internal splines (shown in FIG. 7) that mate with the external splined portion 120 of the hub 102. The spacers 110, 112 slide over the outboard end 123 of the hub 102 as shown in FIG. 1. In one aspect, the spacers 110, 112 have widths of one-half inch. In another aspect, the spacers 110, 112 have widths of varying sizes, such as one-quarter inch and three-quarter inch, to further increase the flexibility of the track center adjustments of the present front hub assembly 100. Additional spacers 110, 112 may also be employed for further flexibility regarding adjusting the track center of the wheel center section 106. In one embodiment of the present front hub assembly 100, the track center may be increased up to one inch per each front wheel, for a combined total outboard track center adjustment of two inches.

FIG. 2 also illustrates an embodiment of the front hub assembly 100 where two spacers 110, 112 are located outboard from the wheel center section 106. In this embodiment the wheel center section 106 is first slid over the external splined portion 120 of the hub 102 and then the spacers 110, 112 are slid over the external splined portion 120. This places the wheel center section 106 nearest to the inboard end of the hub 102.

FIG. 2 illustrates further illustrates a cap screw 118 that connects with spindle axle 116 that are shown and described in more detail below. Spindle axle 116 supports bearings 148, 150, and 152 (shown in FIG. 10), and the spindle axle 116 and bearings 148, 150, and 152 support and are located inside of hub 102 of the front hub assembly 100. Bearings 148, 150, and 152 typically include outer races 149, 151, and 153, respectively, that contacts the internal surface of the hub 102. Also, bearings 148, 150, and 152 typically include inner races (not shown) that contact the spindle axle 116. Spindle axle 116 is typically the outboard extension from the spindle of an axle (not shown) that supports the front hub assembly 100. In addition, brake rotor 108 attaches to the inboard end 121 of the hub 102.

Figure 3:
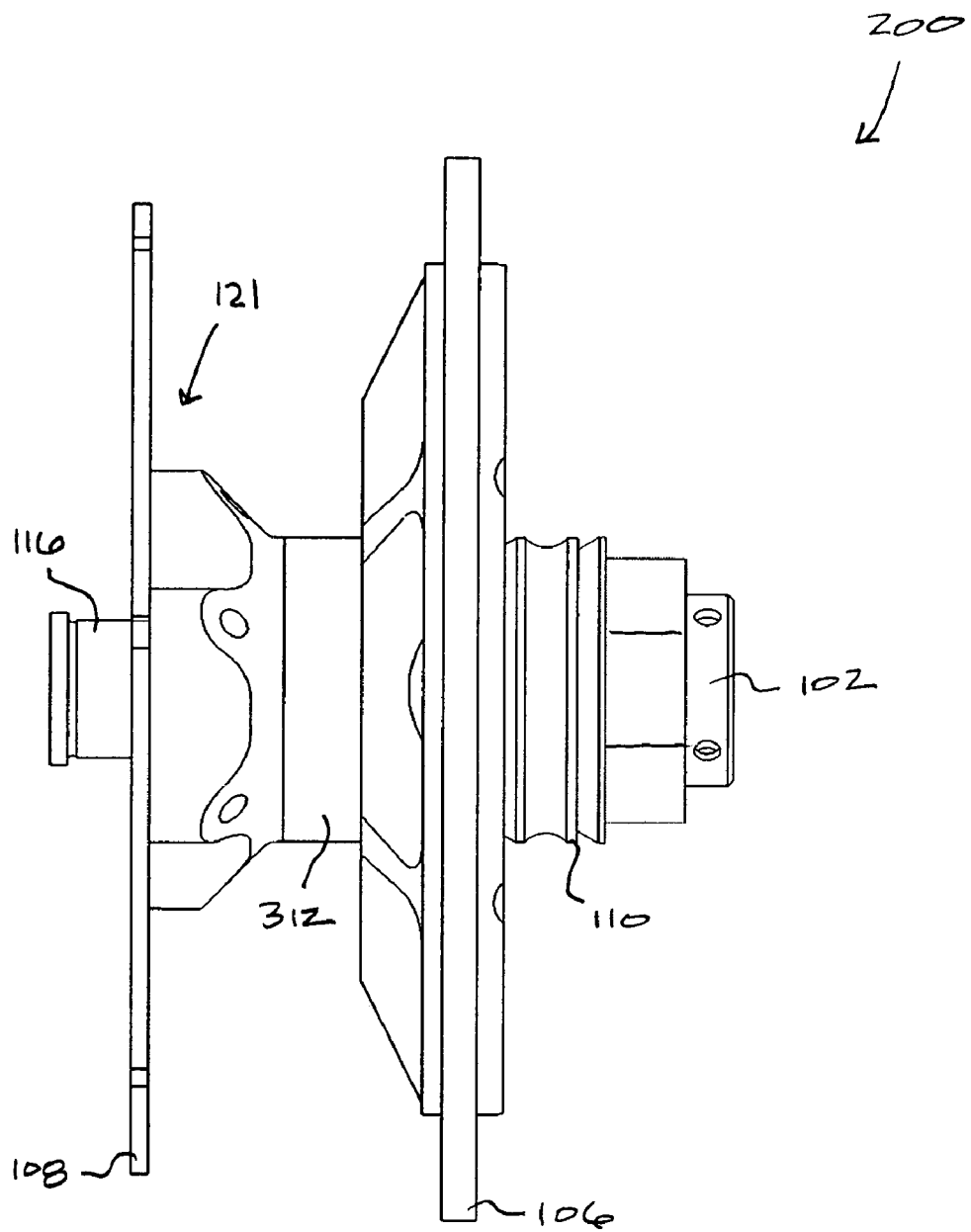
FIG. 3 illustrates a side view of another embodiment of the quick-change adjustable track center front hub assembly of the present invention where a spacer is located outboard and another spacer is located inboard of the wheel center section.

FIG. 3 illustrates an embodiment 200 of the front hub assembly where one spacer 110 is located outboard from the wheel center section 106 and one spacer 312 is located inboard from the wheel center section 106. In this embodiment, spacer 312 is a flat spacer and not tapered, as shown for spacers 110, 112. In another embodiment, spacer 312 can be replaced by spacer 110, 112. In another embodiment, spacers 110 and 112 are interchangeable and can be used on either side of the wheel center section 106. In this embodiment, the wheel center section 106 is spaced outboard from the centerline of the car a distance equal to the spacer 312 relative to embodiment 100. This embodiment is achieved by sliding the spacer 312 over the outboard end 123 of the hub 102 and engaging the internal splines of the spacer 312 to mate with the external splined portion 120 of the hub 102. Then the wheel center section 106 is slid over outboard end 123 of the hub 102 and engaging the internal splines 126 of the wheel center section 106 to mate with the external splined portion 120 of the hub 102. This is followed by sliding the spacer 110 over the outboard end 123 of the hub 102 and engaging the internal spines of the spacer 110 to mate with the external splined portion 120 of the hub 102. This embodiment adjusts outwardly the track center of the wheel center section 106 from the centerline of the car relative to embodiment 100.

Figure 4:
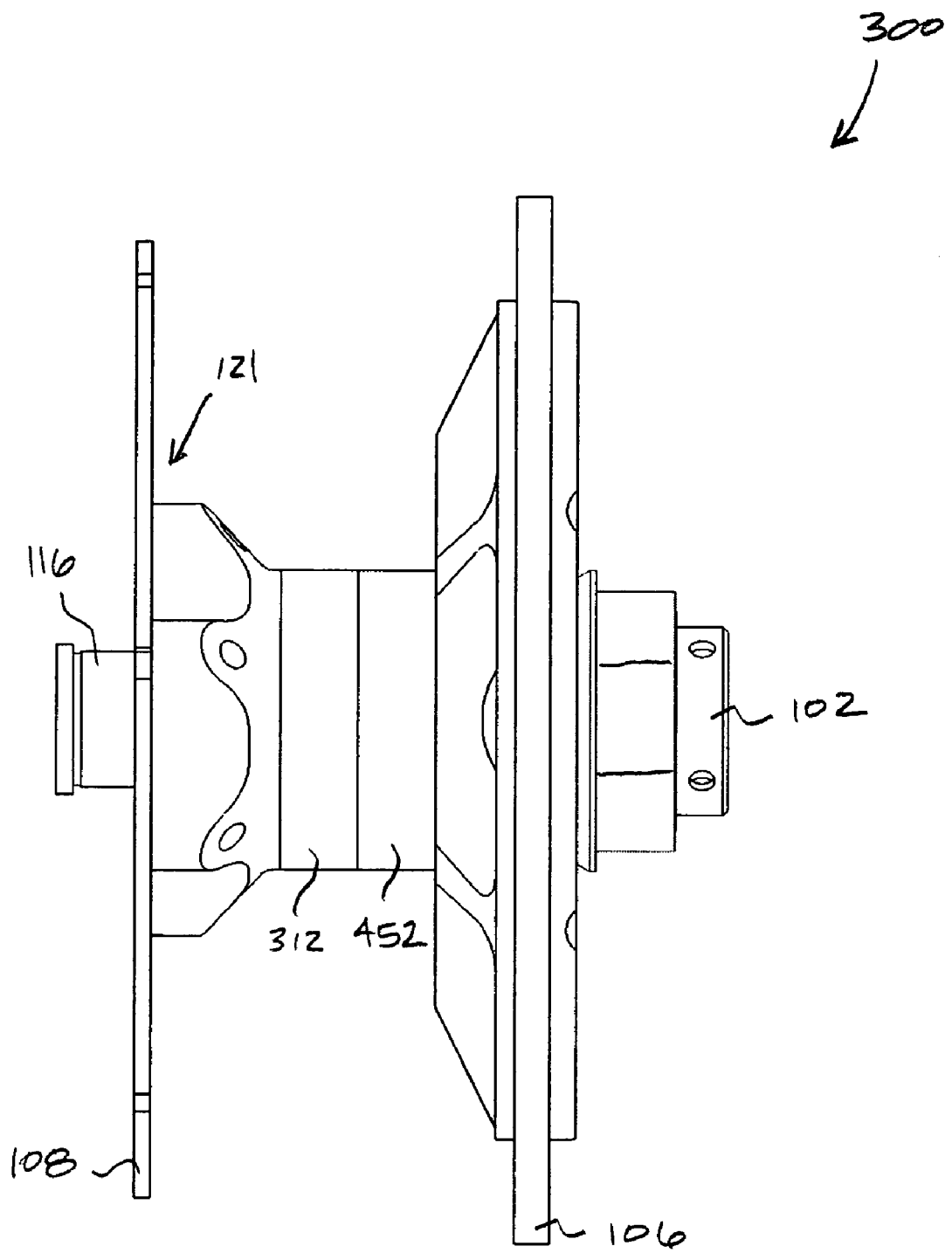
FIG. 4 illustrates a side view of another embodiment of the quick-change adjustable track center front hub assembly of the present invention where two spacers are located inboard of the wheel center section.

FIG. 4 illustrates an embodiment 300 of the front hub assembly 100 where two spacers 312, 452 are located inboard of the wheel center section 106. Spacers 312, 452 are placed onto the hub 102 first then followed by the wheel center section 106. This embodiment adjusts outwardly the track center of the wheel center section 106 from the centerline of the car relative to embodiments 100 and 200. In this embodiment, spacer 312 and 452 are flat spacers. In another aspect of the front hub assembly 100, spacers 110, 112 may be used in the place of spacers 312, 452.

Figure 5:
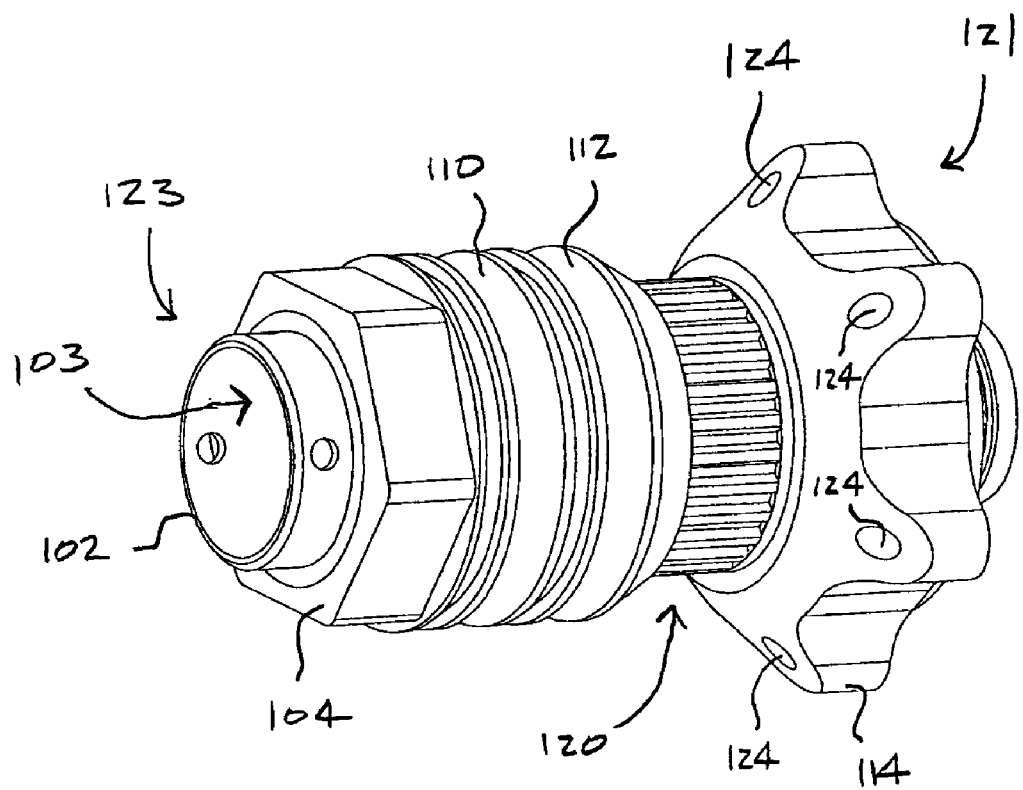
FIG. 5 illustrates an isometric view of the hub of the quick-change adjustable track center front hub assembly of FIG. 1 of the present invention.

FIG. 5 illustrates hub 102 with spacers 110, 112, but without the wheel center section 106. The inboard end 121 of hub 102 has a flanged structure 114 for mating with the brake rotor 108 as shown in FIG. 1. Flanged structure 114 includes a plurality of bolt holes 124 for accepting bolts to attach the hub 102 with the brake rotor 108. Lug nut 104 is shown secured to the outboard end 123 of the hub 102. Typically, the lug nut 104 has an inner threaded portion for connecting to the hub 102, which also includes an outer threaded portion that is near or at the outboard end 123 of the hub 102. In addition, the internal surface 103 of the hub 102 can be seen.

Figure 6:
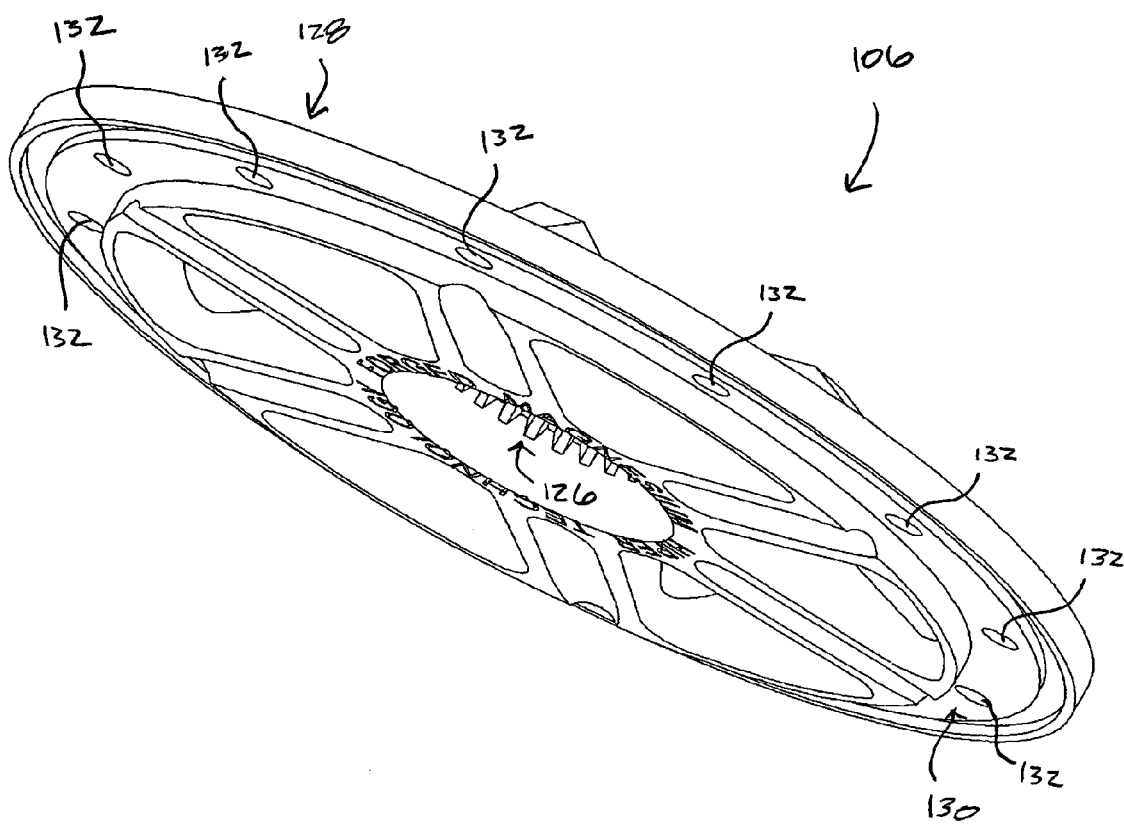
FIG. 6 illustrates an isometric view of the wheel center section of the quick-change adjustable track center front hub assembly of FIGS. 1, 2, 3, and 4 of the present invention.
Figure 7:
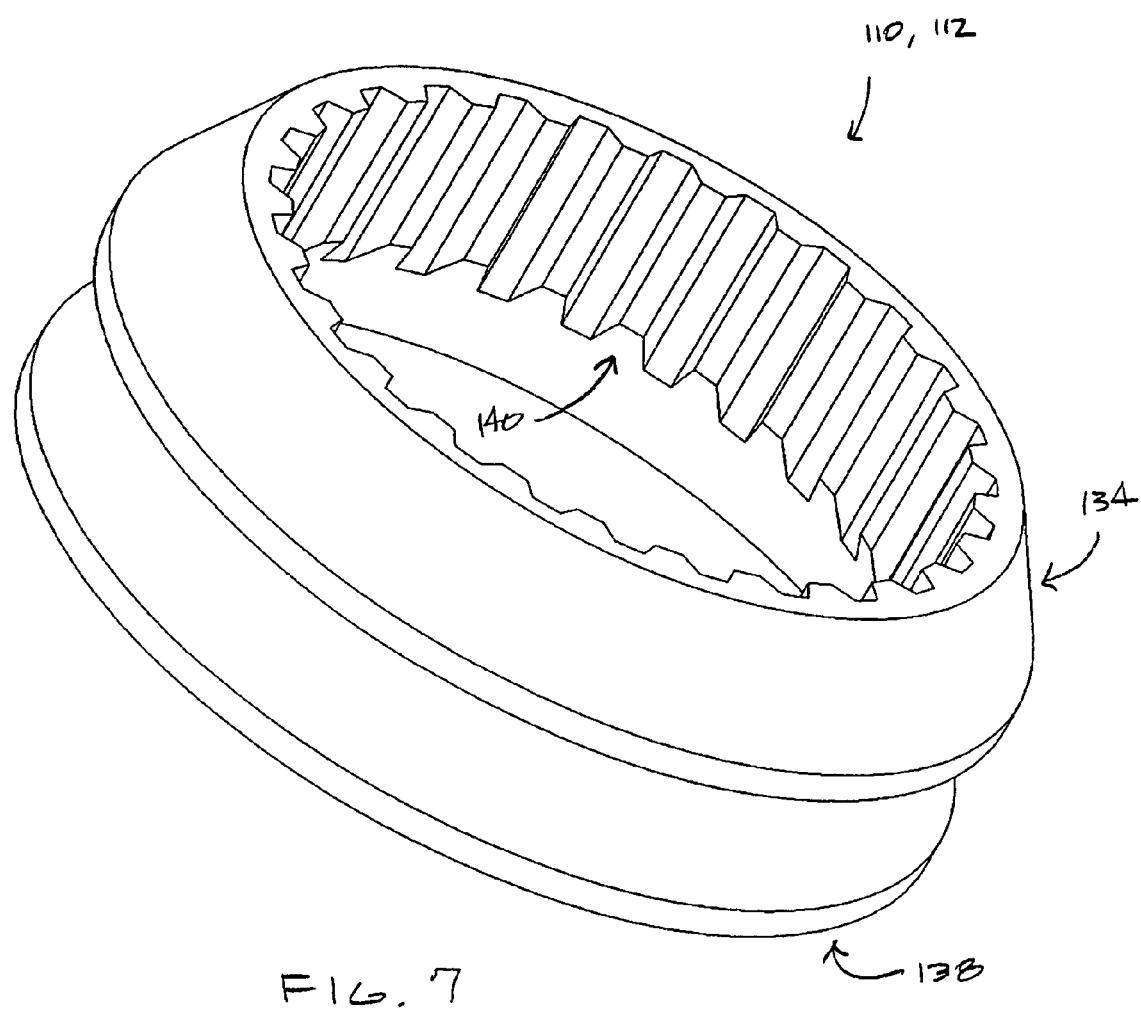
FIG. 7 illustrates an isometric view of a spacer of the quick-change adjustable track center front hub assembly of FIGS. 1, 2, 3, and 4 of the present invention.
Figure 8:
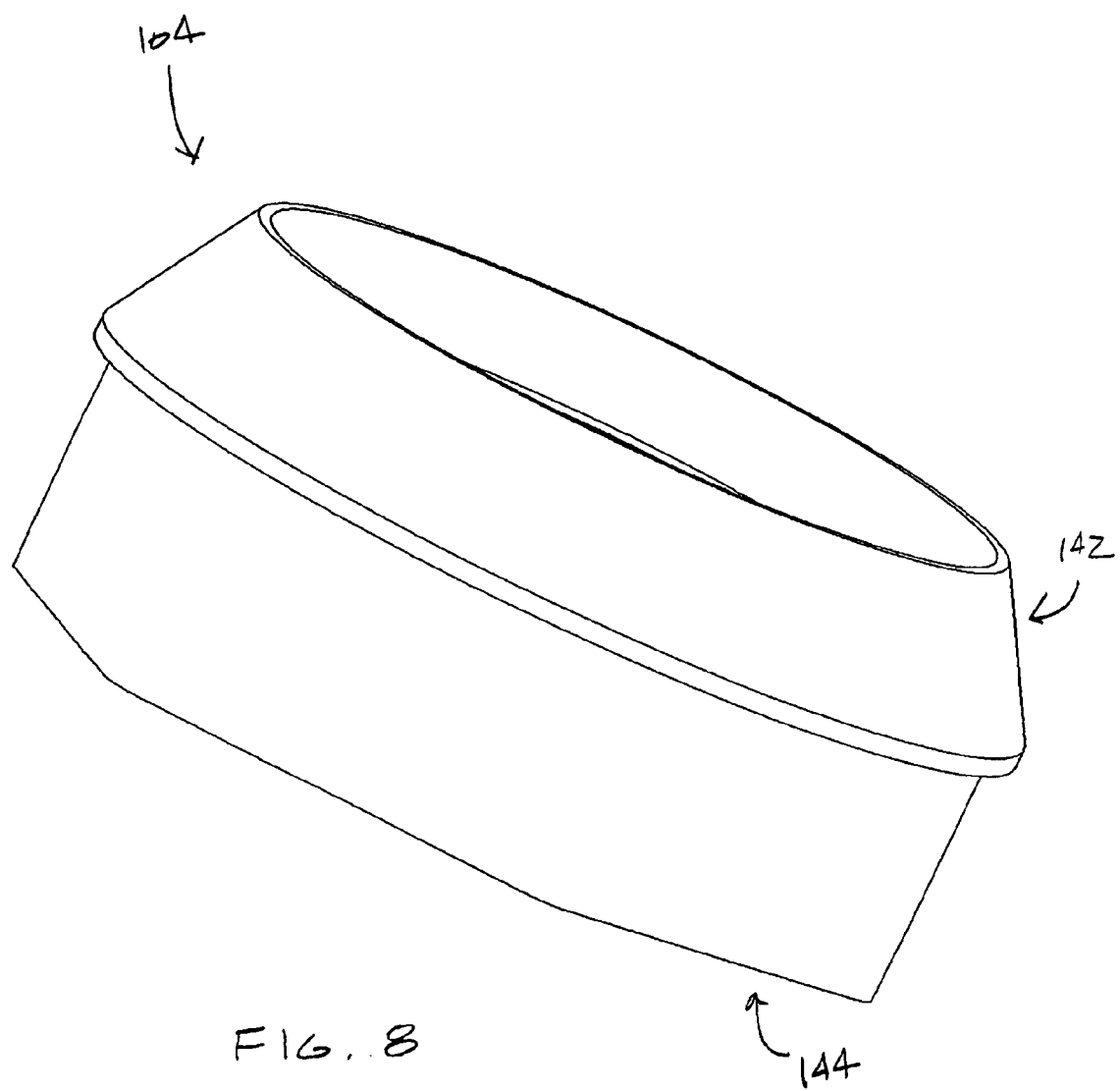
FIG. 8 illustrates an isometric view of the lug nut of the quick-change adjustable track center front hub assembly of FIGS. 1, 2, 3, and 4 of the present invention.

FIG. 6 illustrates an aspect of a wheel center section 106 having an inboard side 128 and an outboard side 130. Preferably, wheel center section 106 includes a plurality of bolt holes 132 for securing the two rim halves as described below. In addition, internal splines 126 can be seen for mating with external splined portion 120 of the hub 102. FIG. 7 illustrates an aspect of spacers 110, 112 including internal splines 140 for mating with the external splined portion 120 of the hub 102. In one embodiment, spacers 110, 112 have a tapered end 134 and a flared end 138 for aligning one next to another in an arrangement as shown in FIG. 5. In another embodiment, spacers 110, 112 may possess a flared end 138 but not a tapered end 134, or neither depending on the desired application. Furthermore, FIG. 8 illustrates a lug nut 104 having an outboard portion shaped 144 for use by a wrench or tool to remove or replace the lug nut 104. In one embodiment, lug nut 104 also has a tapered end 142 for purposes of fitting with the flared end 138 of spacers 110, 112.

Figure 9:
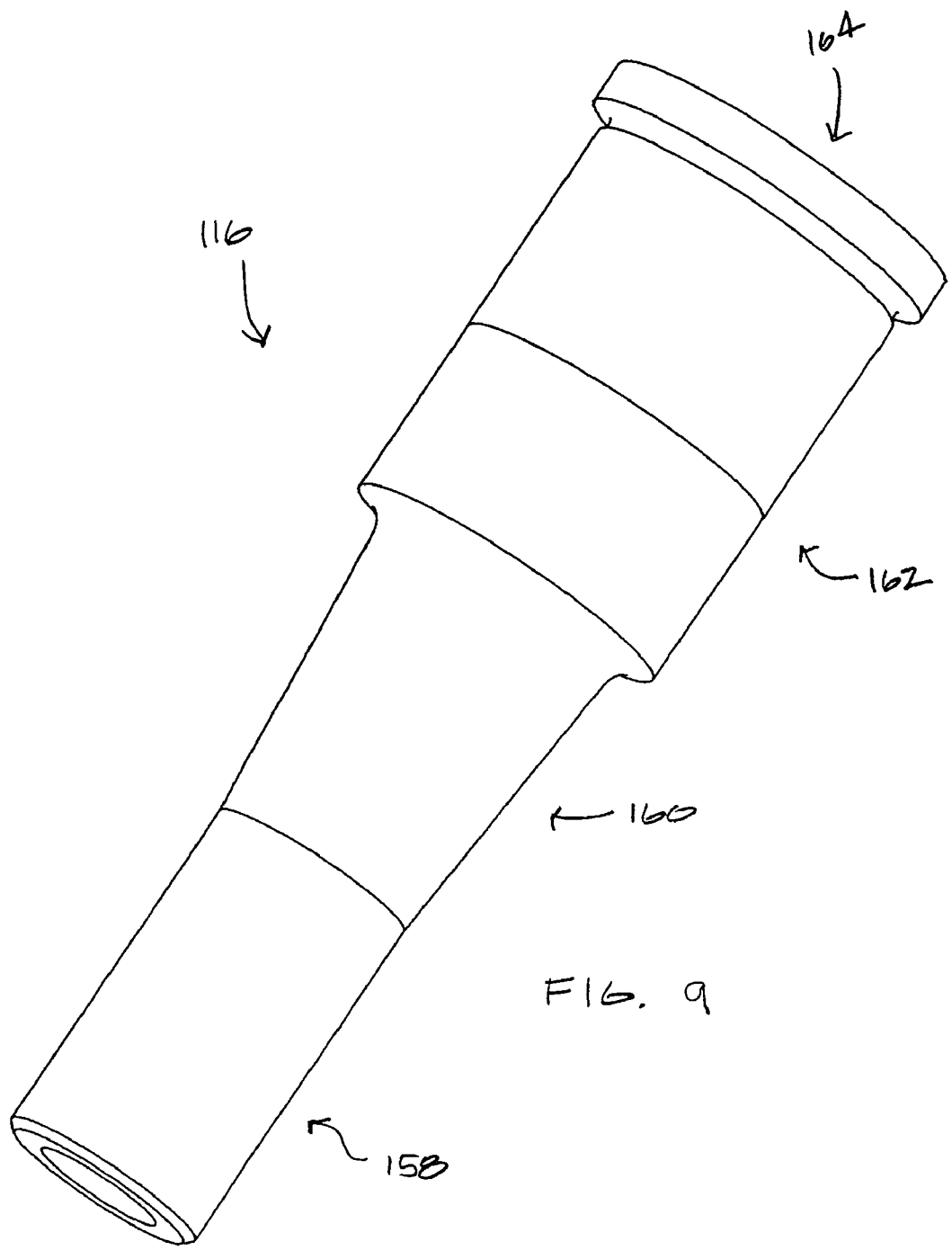
FIG. 9 illustrates an isometric view of the spindle axle of the quick-change adjustable track center front hub assembly of FIGS. 1, 2, 3, and 4 of the present invention.
Figure 10:
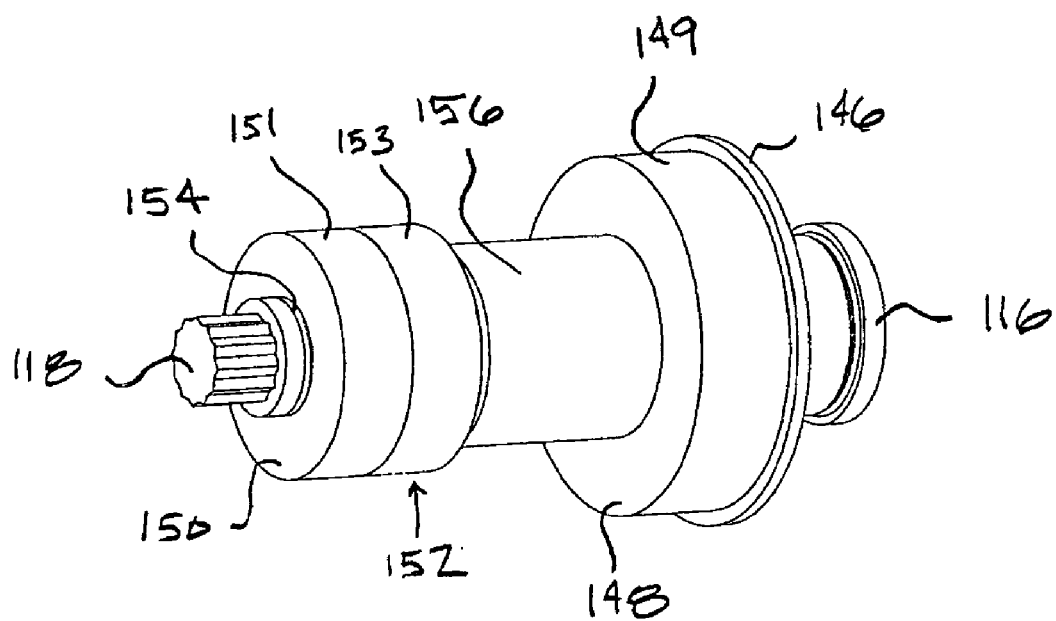
FIG. 10 illustrates an isometric view of the bearings arrangement and spindle of the quick-change adjustable track center front hub assembly of FIGS. 1, 2, 3, and 4 of the present invention.

FIG. 9 illustrates a spindle axle 116 and includes an end 164 that is connected to or is the outward extension of an axle for supporting the front hub assembly 100. Spindle axle 116 includes areas 162, 160, and 158 for supporting at least one or all of bearings 148, 150, and 152. In one aspect, the spindle axle 116 is a one inch press fit bore spindle. The spindle axle 116 can also have different diameters as well. FIG. 10 illustrates a spindle axle 116 and bearings 150 and 152 separated from bearing 148 by axle spacer 156. Bearings 148, 150, and 152 are secured and kept in position on spindle axle 116 by the races of the bearings being in contact with the spindle axle 116 and the force exerted on the bearings 148, 150, and 152 by the cap screw 118 and the torque washer 154, which when tightened, provides force for tightening the races of the bearings 148, 150, and 152 that cause the races of the bearings 148, 150, and 152 to grip around the spindle axle 116 and the internal surface 103 of the hub 102 (shown in FIG. 5) in a friction drive type manner, thus securing the hub 102 onto the spindle axle 116. By tightening the cap screw 118 and torque washer 154, the inner races of the bearings tighten against each other, which cause the bearings 148, 150, and 152 to secure the spindle axle 116 to the hub 102.

Additionally, snap ring 146 further provides frictional forces for retaining bearings 148, 150, and 152 between the spindle axle 116 and the internal surface 103 of the hub 102. The space between bearings 150 and 152 and bearing 148 created by axel spacer 156 provides the necessary distance for handling the increased side and torsional loads exerted on the front hub assembly 100. Specifically, the present front hub assembly 100 can handle continuous side loads of up to 6,500 pounds, whereas the prior art designs could barely sustain continuous side loads of 4,200 pounds. The spacing of the bearings provides better and greater resistance to torsional or torque loads on the hub 102, thus also providing a greater side load resistance.

In one aspect of the present front hub assembly 100, the wheel center section 106 is attached, bolted, connected, or affixed to an inboard wheel halve and an outboard wheel halve that together form a vehicle wheel for accepting a tire. In another aspect of the front hub assembly 100, the wheel center section 106 is formed as a one-piece vehicle wheel for accepting a tire. In one aspect, information related to these wheel configurations and designs can be found in U.S. patent application Ser. No. 10/029,790 filed 29 Oct. 2001 by Darnell, said application published 01 May 2003 under Publication No. US 20030080609 A1, now abandoned, and incorporated by reference herein.

The dimensions of the components of the front hub assembly 100 are sized to fit all vehicles that have a spindle axle 116, such as conventional mini and micro sprint cars. The axle diameter is typically one inch, but can be larger or smaller depending on the application. In one aspect the spindle axle 116 is one inch in diameter, but can be different diameters as well. The materials for the components of the front hub assembly 100 are typically those metals and compositions that are commonly found in the industry. The spindle is typically made of 4140 carbon steel, or some other equivalent strength material, such as 4130 chrome-moly or other high strength high carbon content steel. In addition, the hub 102, lug nut 104, axel spacer 156, cap screw 118, torque washer 154, spacers 110, 112, are made of a materials selected from aluminum, aluminum alloys, wrought aluminum, magnesium, titanium, nickel, zinc, or alloys of these. An exemplary material is T6 6061 aluminum. The brake rotor 108 is preferably made of 1008 low carbon steel, or equivalent strength material.

The bearings are preferably roller bearings, needle bearings and the like, and may also be any other type of bearings suitable for the purposes of front hub assembly 100. In one embodiment, the bearings 150, 152 are approximately 0.625 inner diameter and 1.375 outer diameter, and a 0.4375 width, or the equivalent, such as commonly known bearings with part number 1623 with a seal part number of 2 rs (two rubber seals). In another embodiment, the bearings 151, 153 have different widths and may also be double side-load bearings, and the like. The selection of the bearings 150, 152 may be based on the side loads that will be experienced in the sprint car. In one embodiment, bearing 148 is preferably a two inch outer diameter, one inch inner diameter with a 0.625 inch width.

Figure 11:
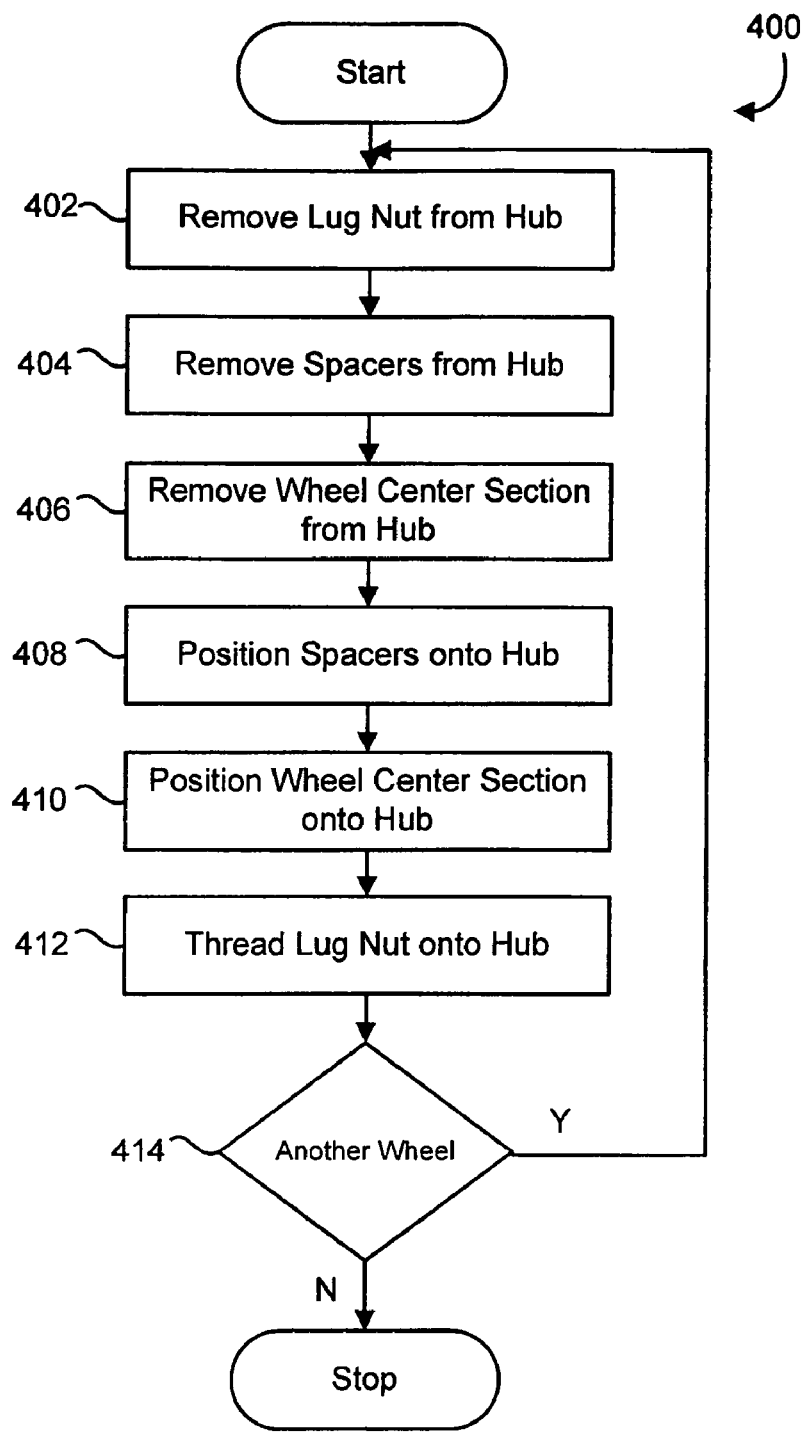
FIG. 11 illustrates process flow diagram for expanding the track center of the quick-change adjustable track center front hub assembly of the present invention.

In addition to the aforementioned aspects and embodiments of the present front hub assembly 100, the present invention further includes methods for adjusting the track center of the front hub assembly 100. FIG. 11 illustrates an embodiment of a process 400 for increasing the track center of the front wheels of a sprint car. In step 402, the single lug nut 104 is removed completely from the hub 102 of the front hub assembly 100. This may be accomplished by using the tool or wrench that fits the rear wheel lug nut of the sprint car. In step 404, the spacers 110, 112 are removed completely from the front hub assembly 100 by pulling or sliding them off of the splined portion 120 of the hub 102. In step 406, the wheel center section 106 is removed completely from the front hub assembly 100 by pulling or sliding it off of the splined portion 120 of the hub 102. Then in step 408 both spacers 312, 452 are placed back on the front hub assembly 100 by sliding them back on the splined portion 120 of the hub 102. In step 410, the wheel center section 106 is then placed back on the front hub assembly 100 by sliding it back on the splined portion 120 of the hub 102. In step 412, the lug nut 104 is threaded back on the hub 102 and tightened with a tool. In step 414, the process is repeated until both of the front wheels of the car are adjusted as desired. In another aspect of step 408 one of the spacers 312, 452 are placed onto the hub 102 and the other one of the spacers 110, 112 is placed onto the hub 102 following the placement of the wheel center section 106 onto the hub 102.

Figure 12:
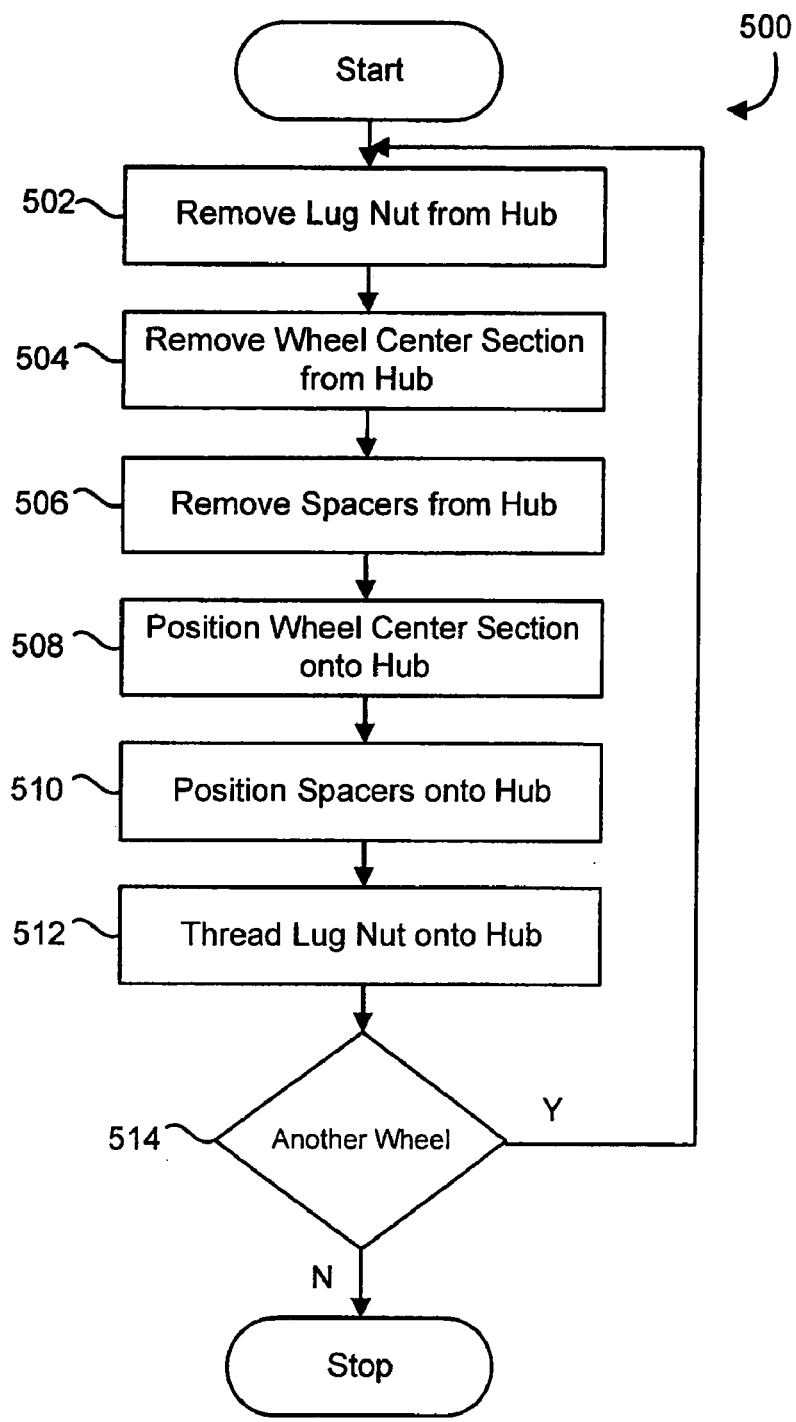
FIG. 12 illustrates another process flow diagram for decreasing the track center of the quick-change adjustable track center front hub of the present invention.

FIG. 12 illustrates another embodiment of a process 500 for decreasing the track center of the front wheels of a sprint car. In step 502, the single lug nut 104 is removed completely from the hub 102 of the front hub assembly 100. This may be accomplished by using the tool or wrench that fits the rear wheel lug nut of the sprint car. In step 504, the wheel center section 106 is removed completely from the front hub assembly 100 by pulling or sliding it off of the splined portion 120 of the hub 102. In step 506, the spacers 312, 452 are removed completely from the front hub assembly 100 by pulling or sliding them off of the splined portion 120 of the hub 102. In step 508, the wheel center section 106 is then placed back on the front hub assembly 100 by sliding it back on the splined portion 120 of the hub 102. Then in step 510 both spacers 110,112 are placed back on the front hub assembly 100 by sliding them back on the splined portion 120 of the hub 102. In step 512, the lug nut 104 is threaded back on the hub 102 and tightened with a tool. In step 514, the process is repeated until all of the front wheels of the car are adjusted as desired. In another aspect of step 508 one of the spacers 312, 452 is placed onto the hub 102 and the other one of the spacers 110, 112 is placed onto the hub 102 following the placement of the wheel center section 106 onto the hub 102.

Figure 13:
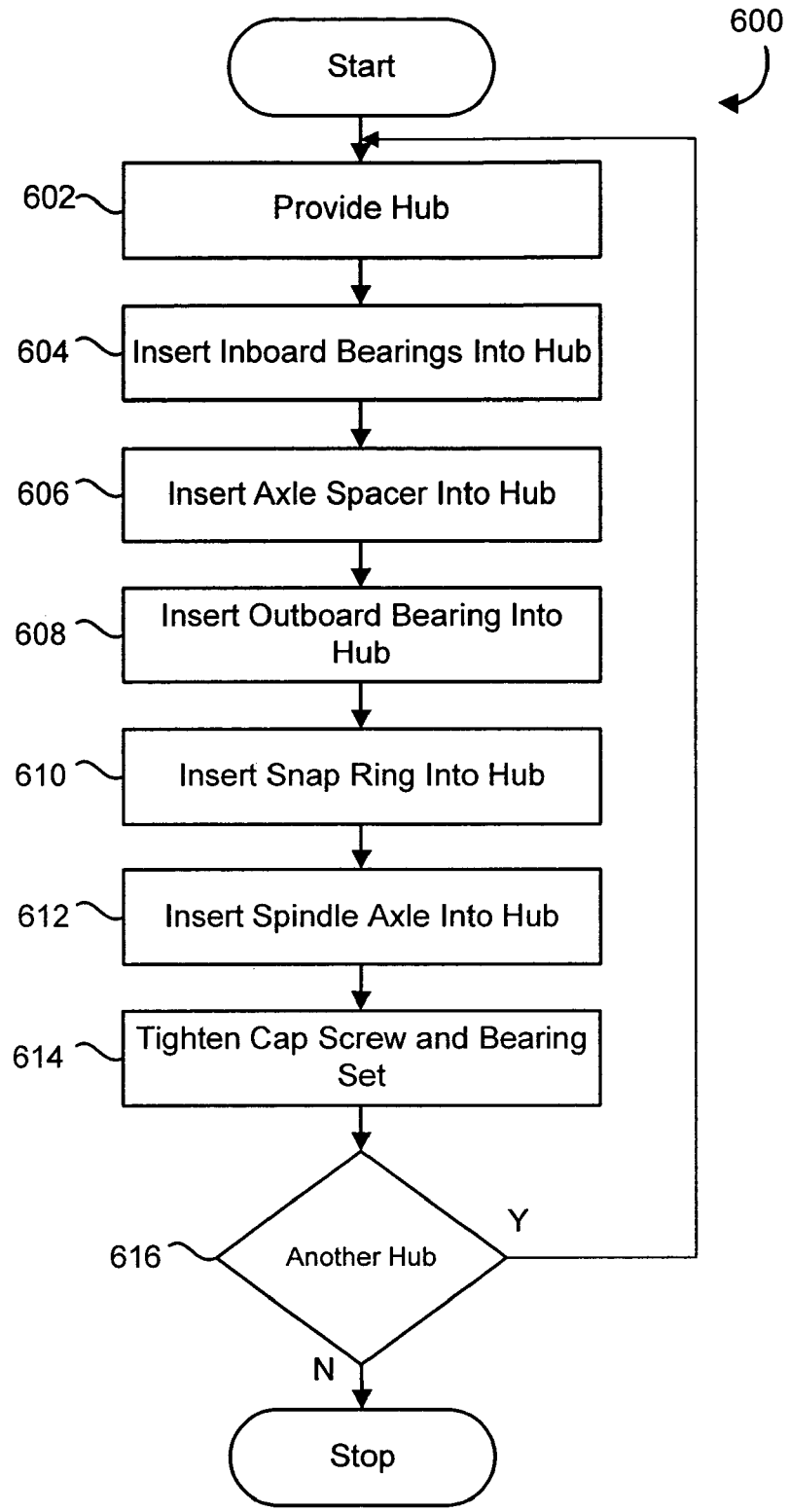
FIG. 13 illustrates another process flow diagram for manufacturing the front hub assembly of the invention.

FIG. 13 illustrates another embodiment of a process 600 for producing the front hub assembly 100. In step 602 a hub is provided. In one embodiment, hub 102 is manufactured by a lathe-turned process, such as a live tooling lathe, to form the profile and the inner bearing profiles against the internal surface 103 for seating the bearing 150, 152 of the hub 102. Then the inboard end 121 of the hub 102 is milled in a milling process and the bolt holes 124 are preferably drilled and tapped. In one embodiment, the external splined portion 120 of the hub 102 is manufactured by a single-point milling operation on a rotory table, or other suitable processes. In another embodiment, the external splined portion 120 of the hub 102 is manufactured by a single-point shaper in the vertical axis. Preferably, the hub 102 is manufactured as a single piece. In addition, the hub 102 can be manufactured as a multi-component piece.

In step 604, the inboard bearings 150, 152 are press fit into the inboard end 121 of the internal surface 103 of the hub 102. In step 606, the axle spacer 156 in positioned in the internal surface 103 of the hub 102 adjacent to the bearings 150, 152. In step 608, bearing 148 is slip fitted into the internal surface 103 of the outboard end of the hub 102 adjacent to the axle spacer 156. Then in step 610, the snap ring 146 is snapped into place against an inner groove (not shown) milled or lathed into the internal surface 103 of the hub 102 towards the inboard end.

In step 612, the spindle axle 116 is inserted into the hub 102. Then in step 614, the cap screw 118 and the torque washer 154 are attached to the outboard end of the spindle axle 116 and tightened, thus tightening bearings 148, 150, and 152 and axle spacer 156 such that they become frictionally engaged both the hub 102 and the internal surface 103 of the hub, thus securing the hub 102 to the spindle axle 116. In step 616, the process is repeated for another front hub assembly 100.

Although there has been described what is at present considered to be the preferred embodiments of the present quick-change adjustable track center front hub assembly, it will be understood that the front hub assembly can be embodied in other specific forms without departing from the spirit or essential characteristics thereof. For example, different wheel center sections or wheels may be used, other than those described herein. Also, other materials for the various components may be used other than those described herein without departing from the inventive novelty described herein. The present embodiments are, therefore, to be considered in all aspects as illustrative and not restrictive. The scope of the invention is indicated by the appended claims rather than the foregoing description.

What is claimed:

1. A front hub assembly for use on a spindle axle of a vehicle for providing quick-change and adjustable track center of a front wheel which consists of a wheel center section and a tire mounted thereon, comprising:

hub means having an inboard end and an outboard end and an external surface and an internal surface, said external surface having external engagement means located between said inboard end and said outboard end of said hub means;

spacer means for providing track center adjustment for said wheel center section that is mounted on said hub means between said inboard end and said outboard end and having internal engagement means for mating with said external engagement means of said external surface of said hub means;

bearing means for providing substantially frictionless movement of said internal surface of said hub means relative to said spindle axle, said bearing means mounted on said spindle axle and located between said internal surface of said hub means and said spindle axle;

bearing securing means for securing said bearing means on said spindle axle; and securing means for securing said spacer means and said wheel center section on said hub means.

2. The front hub assembly of claim 1, further comprising:

structure means for connecting a braking means to said hub means, said structure means located substantially near said inboard end of said hub means.

3. The front hub assembly of claim 1, wherein said spacer means is adjustable for providing varying track center adjustment distances between said center wheel section and a centerline of said vehicle.

4. The front hub assembly of claim 1, wherein said bearing means comprises a plurality of bearings, further comprising:

bearing spacer means for providing a distance within said plurality of bearings.

5. The front hub assembly of claim 1, wherein said hub means comprises a material selected from the group consisting of aluminum, aluminum alloys, wrought aluminum, magnesium, titanium, nickel, zinc, and alloys of said materials.

6. The front hub assembly of claim 1, wherein said spacer means comprises a plurality of spacer elements that can be mounted on said hub means on either side of said wheel center section to adjust the track center of the wheel center line inwardly or outwardly axially with respect to the inboard end of said spindle.

7. A front hub assembly for use on a spindle axle of a sprint car for providing quick-change and adjustable track center of a front wheel, comprising:

a hub having an inboard end and an outboard end and an external surface and an internal surface, said external surface having external splines that run substantially parallel to the major axis of said hub, said external splines located between said inboard end and said outboard end of said hub;

at least two bearings spaced apart from each other by a distance, each of said at least two bearings having an inner race and an outer race, said inner race securingly contacting said spindle axle and said outer race securingly contacting said internal surface of said hub;

at least one spacer located between said inboard end and said outboard end of said hub having internal splines for mating with said external splines of said external surface of said hub;

a cap screw for connecting to said outboard end of said spindle axle for securing said at least two bearings to said spindle axle; and a lug nut for connecting to said outboard end of said hub for securing said at least one spacer to said front hub assembly.

8. The front hub assembly of claim 7, wherein said hub is substantially cylindrically-shaped.

9. The front hub assembly of claim 7, wherein said internal surface of said hub has an inner diameter greater than the outer diameter of said spindle axle.

10. The front hub assembly of claim 7, wherein said inboard end further comprises a flanged structure for attaching a brake rotor to said hub.

11. The front hub assembly of claim 7, wherein said hub comprises a material selected from the group consisting of aluminum, aluminum alloys, wrought aluminum, magnesium, titanium, nickel, zinc, and alloys of said materials.

12. The front hub assembly of claim 7, wherein each of said at least two bearings is between ⅛ inch to about 1 inch in width.

13. The front hub assembly of claim 7, where each of said at least two bearings is ½ inch in width.

14. The front hub assembly of claim 7, further comprising a snap ring located around said spindle axle inboard axially of said at least two bearings.

15. The front hub assembly of claim 7, further comprising an axle spacer located between said at least two bearings for providing said distance between said at least two bearings on said spindle axle.

16. The front hub assembly of claim 15, wherein said at least two bearings further comprises two bearings adjacent to each other outboard axially from a single bearing separated by said axle spacer.

17. The front hub assembly of claim 7, further comprising a wheel center section located between said inboard end and said outboard end of said hub, said wheel center section having internal splines for mating with said external splines of said external surface of said hub.

18. A method for increasing the track center and providing quick-change of a front wheel mounted on a front hub assembly of a sprint car, said front hub assembly including a hub having an inboard end and an outboard end and an external surface, said external surface having external splines that run substantially parallel to the major axis of said hub, said external splines located between said inboard end and said outboard end of said hub; a wheel center section located between said inboard end and said outboard end of said hub, said wheel center section having internal splines for mating with said external splines of said external surface of said hub, said wheel center section having a rim half attached to each side of said wheel center section; at least one spacer located between said wheel center section and said outboard end of said hub, said at least one spacer having internal splines for mating with said external splines of said external surface of said hub; a lug nut for connecting to said outboard end of said hub for securing said at least one spacer and said wheel center section to said front hub assembly, said method comprising:

removing said lug nut from said outboard end of said hub;
removing said at least one spacer from said hub;
removing said wheel center section from said hub;
positioning said at least one spacer onto said hub;
positioning said wheel center section onto said hub; and
securing said wheel center section and said at least one spacer to said front hub assembly by tightening said lug nut onto said outboard end of said hub.

19. The method of claim 18, further comprising:

positioning additional spacers onto said hub prior to positioning said wheel center section onto said hub.

20. A method for decreasing the track center and providing quick-change of a front wheel mounted on a front hub assembly of a sprint car, said front hub assembly including a hub having an inboard end and an outboard end and an external surface, said external surface having external splines that run substantially parallel to the major axis of said hub, said external splines located between said inboard end and said outboard end of said hub; a wheel center section located between said inboard end and said outboard end of said hub, said wheel center section having internal splines for mating with said external spines of said external surface of said hub, said wheel center section having a rim half attached to each side of said wheel center section; at least one spacer located between said wheel center section and said inboard end of said hub, said at least one spacer having internal splines for mating with said external splines of said external surface of said hub; a lug nut for connecting to said outboard end of said hub for securing said at least one spacer and said wheel center section to said front hub assembly, said method comprising:
- removing said lug nut from said outboard end of said hub;
- removing said wheel center section from said hub;
- removing said at least one spacer from said hub;
- positioning said wheel center section onto said hub;
- positioning said at least one spacer onto said hub; and
- securing said wheel center section and said at least one spacer to said front hub assembly by tightening said lug nut onto said outboard end of said hub.

* * * * *